United States Patent [19]
Yarwood et al.

[11] 3,962,081
[45] June 8, 1976

[54] CERAMIC FOAM FILTER

[75] Inventors: John C. Yarwood, Madison, Conn.;
James E. Dore, Ballwin, Mo.; Robert K. Preuss, Middleton, Conn.

[73] Assignee: Swiss Aluminium Ltd., Chippis, Switzerland

[22] Filed: Mar. 28, 1975

[21] Appl. No.: 563,213

[52] U.S. Cl. .............................. 210/69; 210/73 R; 210/510; 75/68 R
[51] Int. Cl.² ........................................ B01D 39/16
[58] Field of Search ................. 210/69, 71, 73, 510; 55/523; 75/68 R

[56] References Cited
UNITED STATES PATENTS
3,893,917    7/1975    Pryor et al. ................... 210/510 X

*Primary Examiner*—John Adee
*Attorney, Agent, or Firm*—Robert H. Bachman

[57] ABSTRACT

The disclosure teaches an improved ceramic foam filter particularly useful for filtering molten metal, and also a method for filtering molten metal. The filter is characterized by a combination of properties which makes it particularly suitable for use in filtering molten metal.

14 Claims, No Drawings

CERAMIC FOAM FILTER

BACKGROUND OF THE INVENTION

Porous ceramic foam materials are known in the art, for example, having been described in U.S. Pat. Nos. 3,090,094 and 3,097,930. These porous ceramic foam materials are known to be particularly useful in filtering molten metal, as described in copending U.S. Pat. Application SN 430,229 for "Improved Molten Metal Filter" by Michael J. Pryor and Thomas J. Gray, filed Jan. 2, 1974, now U.S. Pat. No. 3,893,917.

Molten metal, particularly molten aluminum, in practice generally contains entrained solids which are deleterious to the final cast metal product. These entrained solids appear as inclusions in the final cast product after the molten metal is solidified and cause the final product to be less ductile or to have poor bright finishing and anodizing characteristics. The inclusions may originate from several sources. For example, the inclusions may originate from surface oxide films which become broken up and are entrained in the resultant molten metal. In addition, the inclusions may originate as insoluble impurities, such as carbides, borides and others or eroded furnace and trough refractories.

It is naturally highly desirable to devise an improved filter for use in removing or minimizing entrained solids from the final cast product, particularly with respect to molten aluminum and especially, for example, when the resultant metal is to be used in a decorative product, such as decorative trim or sheet made from the 5000 series of aluminum alloys, as aluminum Alloys 5252 and 5657. Other aluminum alloys which benefit from improved filtration include: aluminum capacitor foil made from the 1000 series of aluminum alloys, as aluminum Alloys 1145 and 1188 in order to reduce pinhole defects in light gage products and maximize productivity in rolling; high strength extrusion alloys, such as aluminum Alloys 2024 and 7075 in order to obtain high ultrasonic quality; and extrusion alloys of the 6000 series of aluminum alloys, as aluminum Alloy 6061, in order to obtain higher productivity in extrusion operations; etc.

Inclusions as aforesaid cause loss of properties in the finally solidified alloy and lead to degradation of processing efficiency and loss of properties in the final product. For example, one type of finishing flaw which is particularly significant in decorative trim or sheet made from aluminum Alloy 5252 is a stringer defect known as a linear defect.

Rigorous melt treatment processes such as gas fluxing minimize the occurrence of such defects; however, these are not successful in reducing them to a satisfactory level for critical applications. Conventionally, melt filtration is utilized in order to decrease the extent of such defects, and others caused by the presence of inclusions in the melt. The most common form of melt filtration involves the use of open weave glass cloth screens placed in transfer and pouring troughs or in the molten pool of metal in the top of a solidifying ingot. Such filters have been found to be only partially effective since they remove only the larger inclusions. Another type of filter in common use is a bed filter made up, for example, of tabular alumina. Such filters have many disadvantages, perhaps the most serious of which is the great difficulty experienced in controlling and maintaining the pore size necessary for efficient filtration. Another difficulty with such filters is their tendency to produce an initial quantity of metal having poor quality at the start up of each successive casting run. This behavior results in a so-called ingot "butt effect," that is, ingots having butt portions of relatively poor quality which must be scrapped and recycled. Still further, the metal in a bed filter must be maintained molten even when the filter is not in use.

Accordingly, it is a principal object of the present invention to devise an improved filter which is particularly useful for filtering molten metal, and a method for filtering molten metal.

It is a further object of the present invention to devise a ceramic foam filter which is highly advantageous in filtering molten metal, especially molten aluminum, and which is convenient to prepare at a reasonable cost.

It is a still further object of the present invention to provide an improved filter and method as aforesaid which overcomes the art disadvantages referred to above, does not contaminate the melt and does not result in degradation of desirable characteristics in the final metal product.

Further objects and advantages of the present invention will appear hereinafter.

SUMMARY OF THE INVENTION

In accordance with the present invention it has now been found that the foregoing objects and advantages may be readily obtained.

The present invention provides a highly efficient, ceramic foam material for use in filtering molten metal, especially molten aluminum. The ceramic foam material of the present invention is characterized by having an open cell structure with a plurality of interconnected voids surrounded by a web of said ceramic material. The filter of the present invention is further characterized by a combination of critical characteristics. The filter has an air permeability in the range of from 400 to 8000 $\times$ 10$^{-7}$ cm$^2$. In addition, the filter of the present invention has a porosity or void fraction of 0.80 to 0.95. Still further, the filter of the present invention is characterized by from 5 to 45 pores per linear inch and an effective range of filter thickness of from ½ to 4 inches. It has been found that in accordance with the present invention the foregoing filter is particularly useful in the filtration of molten metal, especially molten aluminum. Numerous advantages are achieved utilizing the filter of the present invention, some of which are referred to above and as will be discussed hereinbelow.

In the normal situation one uses a relatively fine filter of the present invention having an air permeability of from 400 to 2500 $\times$ 10$^{-7}$ cm$^2$, a porosity or void fraction of 0.80 to 0.95 and from 20 to 45 pores per linear inch, especially if one is filtering an aluminum alloy of the 5000 series. However, if the input metal is particularly dirty, one should preliminarily filter the metal through a relatively coarse ceramic foam filter having a pore size of between 5 and 20 ppi, air permeabilities of 2500 to 8000 $\times$ 10$^{-7}$ and cm$^2$ and porosities or void fractions of between 0.90 and 0.95. This may be accomplished by providing a single ceramic filter with a gradation of properties or by using a series of filters of differing porosity.

In addition to the foregoing, therefore, the present invention provides a method of filtering molten metal through a ceramic foam filter characterized as aforesaid utilizing a molten metal flow rate through the filter of from 5 to 50 cubic inches per square inch of filter area per minute. In accordance with an alternative embodiment of the method of the present invention, the molten metal may be preliminarily filtered through a relatively coarse ceramic foam filter of the present invention, followed by filtration through a relatively fine, preferred filter of the present invention. This preliminary filtration step may utilize a series of ceramic foam filters of decreasing porosity and is particularly useful with especially dirty melts.

DETAILED DESCRIPTION

In accordance with the present invention, the ceramic foam filter described above has been found to be particularly useful in filtering molten metal, especially molten aluminum. The ceramic foam filter of the present invention is a low cost material which may be conveniently used on a disposable basis.

As indicated hereinabove, the ceramic foam material of the present invention is characterized by having an open cell structure with a plurality of interconnected voids surrounded by a web of said ceramic material. It has been found that the characteristics of the filter of the present invention define a filter which is surprisingly effective in the filtration of molten metal, especially aluminum, at a low cost and achieving surprising filtration efficiency with a flexibility not available heretofore.

The combination of properties of the filter of the present invention are critical in obtaining the desirable results of the present invention. As indicated heretofore, the ceramic foam filters of the present invention have an air permeability in the range of 400 to 8000 × $10^{-7}$ cm$^2$, and in the normal and preferred case in the range of 400 to 2500 × $10^{-7}$ cm$^2$. The air permeability is determined by blowing air through the ceramic foam at a measured rate. In accordance with this procedure the pressure drop is measured by determining the pressure differential between the air entering the foam and the air leaving the foam for a defined area and thickness of foam. The air permeability is then determined in accordance with the following formula:

$$K = \frac{\mu Q L}{A \Delta P}$$

wherein K = the air permeability, , $\mu$ = the dynamic viscosity of air, Q = the flow rate of air through the body, L = the length, that is, the tickness of the ceramic filter material, A = the area, that is, the defined area of the foam and $\Delta P$ = the pressure drop. In accordance with the present invention one utilizes an air flow rate of 30.25 standard cubic feet per minute (scfm) and an area of 73 cm$^2$ (11.3 sq. in.). The foregoing determination of permeability may be found in the text *Micromeretics* by J. M. Dallavalle published by Pitman 1948 at Page 263. It may be seen, therefore, that the air permeability is a function of many variables. For example, the bulk density, the pore size, the surface area and the tortuosity of the flow paths. In accordance with the present invention it has been found that permeabilities greater than 2500 × $10^{-7}$ cm$^2$ give inadequate filtration unless the melt is particularly dirty in which case permeabilities up to 8000 × $10^{-7}$ cm$^2$ may be used, while permeabilities of less than 400 × $10^{-7}$ cm$^2$ give impractically high rates of head build up. A particularly preferred range of permeability has been found to be from 1000 to 1500 × $10^{-7}$ cm$^2$ wherein optimum filtration and low rates of head build up are obtained.

In addition to the foregoing, the ceramic filters of the present invention should have a porosity or void fraction of from 0.80 to 0.95. This variable defines the amount of pores or voids in the ceramic body and may be determined in accordance with the following formula:

$$f_p = \frac{d_t - d_b}{d_t} = 1 - \frac{d_b}{d_t}$$

wherein $f_p$ = the total porosity or void fraction, $d_t$ = the true density of the solid ceramic body and $d_b$ = the bulk density of the ceramic foam body. The foregoing formula may be found in the text *Introduction to Ceramics* by W. D. Kingery, published 1960, by John Wiley at Page 416. It has been found that optimum results are obtained in accordance with porosity values of from 0.85 to 0.90. Naturally, the specific value for $d_t$ will depend upon the particular ceramic body. For example, for alumina-chromia based ceramics, the foregoing porosity values correspond to bulk densities of 0.65 to 0.25 gm/cm$^3$ and the optimum values correspond to from 0.35 to 0.45 gm/cm$^3$. As indicated above the relatively coarse, preliminary filter should have a porosity between 0.90 and 0.95.

In addition to the foregoing, the ceramic filter of the present invention should have an effective range of pore size or pore density in terms of number of pores per linear inch, namely, from 5 to 45 ppi, from 20 to 45 ppi in the normal and preferred case, and optimally from 25 to 35 ppi.

The foregoing three variables, namely, the permeability, the porosity and the pore size, are critical in obtaining the greatly improved characteristics of the present invention. Namely, these variables influence each other in achieving the surprising efficiency of the filter of the present invention. They define in effect how many pores or holes are present in the filter, how they are interconnected and how large they are, the surface area of the ceramic web and they define a surprisingly effective ceramic foam filter.

Still further the ceramic foam filter of the present invention should have an effective range of filter thickness of from ½ to 4 inches, that is, a thickness in the direction of metal flow. The optimum filter thickness is from 1½ inches to 2½inches. It has been found that filters of less than ½ inch in thickness are not effective in removing the bulk of nonmetallics from the molten metal, whereas, increments of thicknesses above 4inches suffer from diminishing filtration rates since the most effective region of the filter is the first 1 inch to 1½ inch in thickness.

An additional and significant characteristic of the effective filters of the present invention is that they should have substantial structural uniformity. In order to provide an effective filter for molten metal the ceramic foam body must have a high degree of structural uniformity. Therefore, although some percentage of blocked pores are helpful and desirable in that they increase flow path tortuosity, these blockages should be homogeneously distributed throughout the ceramic body rather than grouped together. Grouping of blockages will only lead to channeling and inefficient filtration.

A wide variety of materials may be used in the preparation of the ceramic foam filter of the present invention. It is an advantage of the present invention that the low cost and ease of preparation of the filter of the present invention makes the filter convenient to use on a throwaway basis.

In accordance with the present invention the ceramic foam is prepared from an open cell, flexible foam material having a plurality of interconnected voids surrounded by a web of said flexible foam material. Typical materials which may be used include the polymeric foams such as polyurethane foams, and the cellulosic foams. Generally, one may utilize any combustible organic plastic foam material which has resilience and ability to recover its original shape. The foam must burn out or volatilize at below the firing temperature of the ceramic material which is employed. Naturally, the characteristics or dimensions of the polymeric foam should roughly correspond to the desirable dimensions of the resultant ceramic foam material. Generally, one utilizes a foam material having a thickness of from ½ inch to 4 inches since this is the desired thickness of the ceramic foam material.

The filter material of the present invention may be prepared in accordance with the general procedure outlined in the aforesaid copending application U.S. Ser. No. 430,229, now U.S. Pat. No. 3,893,917. As described in said copending application, an aqueous ceramic slurry is prepared and the foam material is impregnated therewith so that the web is coated therewith and the voids are substantially filled therewith. The impregnated material is then compressed by squeezing through preset rolls so that preferably about 80% of the slurry is expelled and the balance is uniformly distributed throughout the foam material, preferably so that some pores are blocked in a uniformly distributed manner to increase the tortuosity. The coated foam material is then dried and heated to first burn out the flexible organic foam and then sinter the ceramic coating, thereby providing the fused ceramic foam having a plurality of interconnected voids surrounded by a web of bonded or fused ceramic in the configuration of the flexible foam.

The aqueous ceramic slurry which is employed depends naturally on the desired ceramic material for the chosen metal to be filtered. One must have sufficient properties in the final product to withstand attack by the particular molten metal and to withstand the particular elevated temperature conditions employed In addition, the slurry should have a relatively high degree of fluidity and should be comprised of an aqueous suspension of the ceramic intended for use in the filter. Preferably, a mixture of alumina and chromia is employed; however, these materials may be employed separately or in combination with other ceramic materials. In addition, other typical ceramic materials which may be used include zirconia, magnesia, titanium dioxide, silica and mixtures thereof. Normally, the slurry contains from about 10 to 40% water and one or more rheological agents, binders or air setting agents. Bentonite has been found to be a particularly preferred additive. Bentonite is a naturally occurring clay composed principally of aluminum and silicates usually with some magnesium and iron. Of course, one could use a chemical equivalent or approximate the composition of this material. The main function of the bentonite component is rheological. The bentonite component results in a slurry having desirable thixotropic properties, that is, resistance to flow at low rates of shear but satisfactory flow properties at high rates of shear. In addition, the bentonite component provides a small setting or binding function and produces some glassy phases upon firing yielding strength in the final product. In addition, an air setting agent which is substantially nonreactive to the molten metal should be employed such as aluminum orthophosphate, magnesium orthoborate or aluminum hydroxy chloride. In addition, a small amount of kaolin may be employed as an additional binder material and rheological agent which provides additional strength in the final product and serves a similar function as the bentonite. Kaolin is a clay composed of mainly alumina and silica. Of course, one could use a chemical equivalent or approximate the composition of this material.

As indicated hereinabove, the ceramic slurry is an aqueous slurry which contains a certain amount of water in order to aid in controlling viscosity so that one can impregnate the foam material with the slurry and also to enable one to work conveniently with the slurry.

In a preferred preparation procedure, slabs of open pore polyurethane foam having appropriate pore sizes are impregnated with the ceramic slurry by complete immersion in a bath of slurry and repeated compression and expansion of the slab by a mechanical plunger device made from perforated steel sheet. This process is continued for 30 seconds to 1 minute or until the interstices of the foam are substantially full of slurry. The impregnated slabs of foam are then removed from the slurry bath and transferred to a squeeze out device. In view of the thixotropic nature of the slurry it is particularly advantageous to vibrate the slurry during impregnation since under the high rates of shear imposed by vibration the slurry flows readily to fill the voids in the foam in a relatively short time. Once the vibration ceases the slurry becomes resistant to flow and so little of it drains from the foam in the subsequent transfer operation.

Naturally, other means of impregnation may be used. One method particularly suited to a continuous operation is to pass the foam slab through rolls totally immersed in the slurry, expelling the air from the pores on the entry side of the rolls in compression and refilling the expanding pores with slurry at the exit of the rolls. Here again, vibration of the bath may be used to advantage.

In order to obtain a uniform and consistent product the extent of explusion of the excess slurry from the impregnated foam should be closely controlled and should be uniform throughout the body. Conventional methods of removing slurry from the organic foam used in manufacture, for example, squeezing, blowing out by compressed air, centrifuging, do not always give satisfactory results in this respect. We have found that one or more passes of the impregnated foam through rolls, the gap of which is set a less than the foam thickness, is the best method.

Use of rolls coated with a material such as grit is preferred since it increases friction and prevents or minimizes slippage in rolling. Use of a moving run out table to support the newly rolled foam as it emerges from the mill is also preferred. Coated rolls and a run out table aid the integrity, uniformity of structure, and shape of the rolled product since they alleviate unwanted distortion effects and minimize unnecessary handling which can disturb slurry distribution.

A high degree of control over the permeability and bulk density of a ceramic foam can be achieved by variation of roll gap settings in a one pass operation. Although a single pass schedule allows ceramic foams to be made in a wide range of permeabilities, the slurry is not completely uniformly distributed through the body so that the outer web is more thinly coated than that near the centerline. We have found that multiple rolling passes at the same or decreasing percent reductions are effective in overcoming this problem. A more uniform ceramic web is obtained with concomitant increases in strength and freedom from centerline blockage.

Thus, typical percent reductions applicable in single rolling passes range from 75% to 90%. The preferred rolling technique utilizes a double pass schedule, although a multiple pass schedule may be desirable on foams thicker than 2 inches. Typical percent reductions are, 50% to 90% for the first pass and 70% to 90% for the second pass.

As indicated above, upon drying and firing the organic foams coated with ceramic slurry, ceramic foams of superior structural uniformity and strength are produced. Conventional techniques of drying and firing may be readily used.

The resultant product is a bonded ceramic foam material having an open cell structure characterized by a plurality of interconnected voids surrounded by a web of ceramic, with the foam material having the characteristics defined hereinabove. If one desires a single foam filter having a gradation of properties from coarse to fine throughout the thickness thereof, one may combine two or more slabs of polyurethane foam having appropriately different pore sizes. Naturally, the ceramic foam may have any desired configuration based on the configuration needed for the particular molten metal filtration process. Although naturally these configurations can be many and varied, particular configurations may be preferred for filtration in a transfer trough between the furnace and the casting mold in filtering molten aluminum. A wide variety of suitable configurations may be readily and conveniently prepared in view of the flexibility afforded by the preparation process utilized herein. It is a particular advantage of the ceramic foam material of the present invention that said ceramic foam has sufficient strength property to withstand attack by molten metal and also advantageously does not require excessive heads of molten metal in order to start the filtration process.

As indicated hereinabove, the present invention also provides a method of filtering molten metal through a disposable ceramic filter characterized as aforesaid by pouring said molten metal through the ceramic material at a rate of from 5.0 to 50 cubic inches per square inch of filter area per minute, and preferably from 10 to 30 cubic inches per square inch of filter area per minute for aluminum. Metal flow rates in normal aluminum casting operations vary from a minimum of about 200 lbs. per minute to a maximum in excess of 2000 lbs. of metal per minute, with a typical bulk metal flow rate being about 500 lbs. per minute. In accordance with the present invention the ceramic materials of the present invention are well suited to operate successfully utilizing bulk metal flow rates as described above. Normally, for aluminum, the particular specific flow rate of metal within the filter should not exceed 5 lbs. of metal per square inch of filter cross section per minute and preferably should be less than 3 lbs. per square inch per minute. Higher flow rates through the filter than indicated above results in the filters passing too many undesirable nonmetallics for the production of a high grade sheet product. The lower limit is governed by practical size considerations and would require an impractically large filter to handle bulk metal flow rates in excess of 1,000 lbs. per minute, that is, a ceramic filter greater than 45 inches square or 2025 square inches would be required. A typical filter of the present invention may, therefore, be defined as being 16 inches square or about 250 square inches designed to pass 500 lbs. of metal per minute at a specific flow rate of 2 lbs. per square inch per minute.

In addition to the foregoing, the quality of the input metal is an important variable. If the input metal is particularly dirty, and if the preferred, relatively finer foam is used, it will quickly block the ceramic filter of the present invention. The output quality, that is, the resultant filtered metal is a function of input quality. Hence, a minimum input quality should be provided in order to assure a good output quality. In order to insure a good output quality, in accordance with the present invention one may preliminarily filter the molten metal through a relatively coarse ceramic foam filter and optimally utilize a series of foam filters of decreasing porosity. Thus, as indicated hereinabove, in accordance with the present invention a typical preliminary filtration step would utilize a relatively coarse ceramic foam filter having a pore size of between 5 and 20 ppi, air permeabilities of 2500 to 8000 $\times$ $10^{-7}$ $cm^2$, porosities or void fractions of between 0.90 and 0.95, bulk densities of between 0.20 and 0.35 and thicknesses of 0.5 to 4 inches. A series of such filters having decreasing permeability is particularly suitable. Alternatively, a single preliminary filter or a single filter of the present invention may be utilized having a gradation of properties from coarse (high permeability) to fine (low permeability) through its thickness may be used In accordance with the present invention the specific features thereof will be more readily understandable from a consideration of the following illustrative examples.

EXAMPLE I

A polyurethane foam was provided having a thickness of 2 inches. An aqueous ceramic slurry was provided having the following composition: 47% $Al_2O_3$, 13% $Cr_2O_3$, 3.5% kaolin, 1% bentonite and 14½% colloidal aluminum orthophosphate added as an aqueous solution with an equal amount of water. The slurry contained 82% solids and 18% water. The foam material was immersed in the slurry and kneaded to remove air and substantially fill voids with the slurry and also to coat the fibrous webs of the foam with the slurry. The resultant impregnated foam was removed from the slurry and subjected to compression through preset rolls to squeeze approximately 80% of the slurry out of the foam by passing the impregnated foam through the preset rollers. The foam material sprung back to its original dimension after passing through the rollers and had the fibrous plyurethane filaments coated with a substantially uniform residue of the ceramic slurry. The material was oven dried at 125°C for 1 hour, heated slowly at a heat up rate of 0.5°C per minute to 500°C to drive off the water and allow the polyurethane fibers to volatilize and/or burn out without collapsing the ceramic and without destroying the filamentary ceramic configuration. The foam was held at 500°C for 1 hour and was subsequently heated to 1350°C at a rate of 1°C per minute, held at 1350°C for 5 hours to permit the ceramic to sinter together and thereby provide an open cell ceramic foam material having a configuration of the original polyurethane foam material. The characteristics of the resultant foam were as follows:

| | |
|---|---|
| Permeability | $1425 \times 10^{-7}$ cm$^2$ |
| Porosity | 0.87 |
| Pore Size | 30 pores per linear inch |
| Thickness | 2" |
| Structural Uniformity | Excellent |

EXAMPLE II

A 50,000 lb. charge of aluminum Alloy 5252 containing 2.3% magnesium, 0.04% silicon, 0.05% iron and 0.06% copper was melted in a gas fired open hearth furnace and fluxed with chlorine gas according to conventional practice. This unfiltered metal was then cast into three 20 inches × 53 inches cross section rolling ingots weighing 10,000 lbs. each.

A second charge of the same composition was melted and prepared for casting in accordance with the same practice except, however, the metal was passed through the ceramic foam filter prepared in Example I installed in the pouring trough before the metal was cast into rolling ingots. A metal head of only 6 inches was required to prime the filter and during the casting the running head loss built up from ⅛ inch to 1 inches after 30,000 lbs. of metal had been filtered therethrough.

Pressure filter tests were run on metal taken from upstream and downstream of the filter during the casting of the filtered metal and from the pouring trough during the casting of the unfiltered metal. The filtration affect of the ceramic foam filter of the foam of the present invention proved to be excellent. Cross sections of the pressure filter disc from the unfiltered metal were compared with cross sections of the pressure filter disc from the filtered metal. These cross sections clearly showed that little or no residue was present in the metal filtered with ceramic foam filter of the present invention; whereas, considerable amounts of residue existed in the cross section of the pressure filter disc from the unfiltered metal. Similarly, a pressure filter disc was obtained upstream of the ceramic foam filter and resulted in the presence of considerable residue therefrom. This clearly shows the effectiveness of the ceramic foam filter of the present invention.

The pressure filter test described above is a method of concentrating and examining the nonmetallic particulate in a 20 to 25 lb. sample of molten aluminum. The molten aluminum in this test is carefully ladled into a preheated 25 lb. clay graphite crucible into the base of which is set a 30 mm diameter, 3 mm thick porous silica disc plug. 90% of the metal is forced through the disc by application of air pressure and the remaining metal solidified in situ. The disc and adjacent metal are then sectioned, polished and examined by normal metallographic techniques to reveal the quantity of nonmetallics filtered out.

EXAMPLE III

The ingots prepared in Example II were all rolled down to 0.030 inch gage and samples of the sheet from coil locations corresponding to the head and butt sections of the ingots were tested to reveal the incidence of linear defects per unit area of sheet. The sheet manufactured from filtered metal was found to contain about 10 times fewer linear defects than did the sheet manufactured from unfiltered metal as indicated in Table I below. This is a further strong indication of the effectiveness of the ceramic foam filter of the present invention.

In addition to the foregoing, the spent ceramic foam filter utilized in Example II was examined metallographically. Considerable oxide stringers and fine non-metallic particulates were found to be captured in the web of the filter, showing further evidence of the filtration power of the filter of the present invention.

In addition, mechanical properties and composition were tested in metal filtered in accordance with the present invention. Good mechanical properties were obtained and no metal contamination was found to exist in the resultant product due to the use of the ceramic filter of the present invention.

EXAMPLE IV

A further 50,000 lb. melt of aluminum Alloy 5252 was prepared as in Example II. In this case, the metal was filtered through a tabular alumina bed in accordance with conventional practice prior to casting into rolling ingots for comparative purposes. The ingot thus cast was rolled down to 0.030 inch gage sheet and samples were removed at locations in the resultant coil corresponding to the ingot butt, a location 20 inch from the ingot butt and the ingot head. The samples were then tested to reveal the incidence of linear defects. The results of this inspection are shown in Table I below together with similar data carried out on unfiltered metal and ceramic foam filter metal from Example II. The results in this table are given as percentages using the unfiltered metal as basis for comparison.

TABLE I

| | Comparative Linear Defect Counts | | |
|---|---|---|---|
| Type of Metal | Butt | 20" From Butt | Head |
| Unfiltered Metal | 100% | 100% | 100% |
| Bed Filtered Metal | 150% | 25% | 10% |
| Ceramic Foam Filter Metal | 10% | 10% | 10% |

These results clearly show the reduced quality of the butt region of the ingot produced by filtration with the commercial bed filter as compared with that produced by the filter of the present invention.

EXAMPLE V

An additional 50,000 lb. charge of aluminum Alloy 5252 was prepared as in Example II. The metal was passed through a ceramic foam filter prepared in Example I, with the filter being installed in the pouring trough in a manner similar to that described in Example II. The filter used was identical to that of Example I except that the available area of the filter was cut by two thirds with a result that the specific flow rate of metal within the filter was 6 lbs. per square inch per minute which is higher than the maximum specified flow rate of the present invention.

The resultant ingots were all rolled down to 0.030 inch gage and samples were removed and tested to reveal the incidence of linear defects in the manner of Example IV. The results of this inspection are set out in Table II below and compared to equivalent inspections carried out on unfiltered metal and metal filtered through the ceramic foam as in Example II at a flow rate of 2 lbs. per square inch per minute. The results are given as percentages using the unfiltered metal as a basis for comparison.

TABLE II

| Type of Metal | Comparative Linear Defect Counts | | |
|---|---|---|---|
| | Butt | 20" From Butt | Head |
| Unfiltered Metal | 100% | 100% | 100% |
| Ceramic Foam Filtered Metal (2 lbs/sq in/min) | 10% | 10% | 10% |
| Ceramic Foam Filtered Metal (6 lbs/sq in/min) | 150% | 50% | 150% |

The foregoing clearly demonstrates the reduced product quality obtained when one exceeds the specified flow rate range of the present invention.

EXAMPLE VI

A further 50,000 lb. charge of aluminum Alloy 5252 was prepared as in Example II. The metal was passed through a ceramic foam filter prepared in accordance with Example I installed in the pouring trough in a like manner to that described in Example II. The filter was similar to that of Example I in composition, thickness and structural uniformity but differed in the following respects:

| Permeability | $2140 \times 10^{-7}$ cm² |
|---|---|
| Porosity | 0.92 |
| Pore Size | 20 pores per linear inch |

In addition, the specific metal flow rate in the filter was about 4 lbs. per square inch per minute. Thus, the physical properties of the filter and metal flow rate are within the present invention, but outside the preferred range in terms of permeability, porosity, pore size and specific metal flow rate in the filter.

The ingots thus prepared were all rolled down to 0.030 inch gage and samples from the coils at locations corresponding to the heads and butts of the ingots were tested to reveal that incidence of linear defects in a like manner to that described in Example IV. The results of this investigation are set forth in Table III below and are compared to the results of equivalent inspections carried out on unfiltered metal and metal filtered through the preferred ceramic foam of Example I. The results are given as percentages using the unfiltered metal as a basis for comparison.

TABLE III

| Type of Metal | Comparative Linear Defect Counts | |
|---|---|---|
| | Butt | Head |
| Unfiltered Metal | 100% | 100% |
| Ceramic Foam Filtered Metal (30 ppi filter — 2 lbs/sq in/min) | 10% | 10% |
| Ceramic Foam Filtered Metal (20 ppi filter — 4 lbs/sq in/min) | 40% | 60% |

Thus, the foregoing clearly shows that the use of the filter within the broad specifics of the present invention resulted in an approximately 50% decrease in the incidence of linear defects as opposed to a 90% increase when operating in accordance with the preferred specification of the present invention.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A ceramic foam filter for use in filtering molten metal having an open cell structure characterized by a plurality of interconnected voids surrounded by a web of said ceramic, said filter having an air permeability in the range of from 400 to $8000 \times 10^{-7}$ cm², a porosity of 0.80 to 0.95, a pore size of 5 to 45 pores per linear inch and a thickness of from ½ 4 inches, said filter having substantial structural uniformity with a plurality of homogeneously distributed pore blockages throughout the foam.

2. A filter according to claim 1 wherein said ceramic foam filter has a gradation of properties from coarse to fine throughout the thickness thereof.

3. A filter according to claim 1 having a gradation of properties throughout the thickness thereof, with one side of said filter having an air permeability in the range of 2500 to $8000 \times 10^{-7}$ cm², a porosity of 0.90 to 0.95 and a pore size of 5 to 20 pores per linear inch, and the opposite side of said filter having an air permeability of from 400 to $2500 \times 10^{-7}$ cm², a porosity of 0.80 to 0.95 and a pore size of 20 to 45 pores per linear inch.

4. A ceramic foam filter for use in filtering molten metal having an open cell structure characterized by a plurality of interconnected voids surrounded by a web of said ceramic, said filter having an air permeability in the range of from 400 to $2500 \times 10^{-7}$ cm², a porosity of 0.80 to 0.95, a pore size of 20 to 45 pores per linear inch and a thickness of from ½ to 4 inches, said filter having substantial structural uniformity with a plurality of homogeneously distributed pore blockages throughout the foam.

5. A filter according to claim 4 having an air permeability of from 1000 to $1500 \times 10^{-7}$ cm².

6. A filter according to claim 4 having a porosity of from 0.85 to 0.90.

7. A filter according to claim 4 having a pore size of from 25 to 35 pores per linear inch.

8. A filter according to claim 4 having a thickness of from 1½ to 2½ inches.

9. A ceramic foam filter having substantial structural uniformity for use in filtering molten aluminum having an open cell structure characterized by a plurality of interconnected voids surrounded by a web of said ceramic, said filter having an air permeability of from 1000 to $1500 \times 10^{-7}$ cm², a porosity of from 0.85 to 0.90, a pore size of from 25 to 35 pores per linear inch and a thickness of from 1½ to 2½ inches, said filter having a plurality of homogeneously distributed pore blockages throughout the foam.

10. A method of filtering molten metal through a disposable filter which comprises:
A providing a mass of molten metal;
B providing a ceramic foam filter having an open cell structure characterized by a plurality of interconnected voids surrounded by a web of said ceramic, said filter having an air permeability in the range of from 400 to $8000 \times 10^{-7}$ cm², a porosity of 0.80 to 0.95, a pore size of 5 to 45 pores per linear inch and a thickness of from ½ to 4 inches and having substantial structural uniformity with a plurality of homogeneous pore blockages throughout the foam; and C pouring said molten metal through said material at a rate of from 5 to 50 cubic inches per square inch of filter area per minute, thereby removing entrained solids from the molten metal.

11. A method according to claim 10 including the step of preliminarily filtering the molten metal through a relatively coarse ceramic foam filter having an air permeability of 2500 to 8000 × $10^{-7}$ cm$^2$, a porosity of from 0.90 to 0.95, and a pore size of from 5 to 20 pores per linear inch.

12. A method according to claim 11 wherein said preliminary filtration utilizes a series of ceramic foam filters of decreasing porosity.

13. A method according to claim 11 wherein said preliminary filtration utilizes a single ceramic foam filter having a gradation of properties from coarse to fine throughout the thickness thereof.

14. A method according to claim 10 wherein said molten metal is aluminum.

* * * * *

UNITED STATES PATENT AND TRADEMARK OFFICE
CERTIFICATE OF CORRECTION

PATENT NO. : 3,962,081
DATED : June 8, 1976
INVENTOR(S) : John C. Yarwood, James E. Dore & Robert K. Preuss It is certified that error appears in the above-identified patent and that said Letters Patent are hereby corrected as shown below:

In Column 2, line 60, delete the word "and" after "$10^{-7}$".

In Column 3, line 48, delete the second occurrence of the comma (,) after the word "permeability,";

In Column 3, line 50, the word "tickness" should read ---thickness---.

In Column 5, line 49, after the word "employed" insert a period (.);

In Column 5, line 63, after the word "silicates" insert a comma (,).

In Column 6, line 58, the word "a" should read ---at---.

In Column 8, line 61, the word "plyurethane" should read ---polyurethane---.

In Column 10, line 30, "20 inch" should read --- 20 inches---.

In Column 12, line 12, "1/2 4 inches" should read ---1/2 to 4 inches---.

Signed and Sealed this

Twenty-eighth Day of December 1976

[SEAL]

Attest:

RUTH C. MASON
*Attesting Officer*

C. MARSHALL DANN
*Commissioner of Patents and Trademarks*